US012493903B2

(12) United States Patent
Masuda et al.

(10) Patent No.: US 12,493,903 B2
(45) Date of Patent: Dec. 9, 2025

(54) VEHICLE INFORMATION PROCESSING DEVICE, VEHICLE INFORMATION PROCESSING SYSTEM, AND VEHICLE INFORMATION PROCESSING METHOD

(71) Applicant: TOYOTA JIDOSHA KABUSHIKI KAISHA, Toyota (JP)

(72) Inventors: Yuko Masuda, Toyota (JP); Shuhei Manabe, Sunto-gun Shizuoka-ken (JP); Akihito Nakamura, Toyota (JP); Yasuyuki Kamezaki, Toyota (JP); Masato Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 18/143,863

(22) Filed: May 5, 2023

(65) Prior Publication Data
US 2024/0020749 A1    Jan. 18, 2024

(30) Foreign Application Priority Data
Jul. 15, 2022   (JP) .................................. 2022-114329

(51) Int. Cl.
*G06Q 30/00*   (2023.01)
*G06Q 30/0601*   (2023.01)

(52) U.S. Cl.
CPC ..... *G06Q 30/0609* (2013.01); *G06Q 30/0627* (2013.01)

(58) Field of Classification Search
CPC ............... G06Q 30/00; G06Q 30/0601; G06Q 30/0609; G06Q 30/0623; G06Q 30/0627
See application file for complete search history.

(56) References Cited

U.S. PATENT DOCUMENTS

| | | | |
|---|---|---|---|
| 6,754,564 B2 * | 6/2004 | Newport | B60R 13/10 701/1 |
| 2003/0078709 A1 * | 4/2003 | Yester | B60R 16/037 701/49 |
| 2008/0208701 A1 * | 8/2008 | Betancourt | G06Q 10/02 705/26.8 |

(Continued)

FOREIGN PATENT DOCUMENTS

JP   2018-097764 A   6/2018

OTHER PUBLICATIONS

Park, So Yeon, Dylan James Moore, and David Sirkin. "What a driver wants: User preferences in semi-autonomous vehicle decision-making." Proceedings of the 2020 CHI conference on human factors in computing systems. 2020. (Year: 2020).*

(Continued)

*Primary Examiner* — Christopher B Seibert
(74) *Attorney, Agent, or Firm* — Dinsmore & Shohl LLP (57) ABSTRACT

A vehicle information processing device includes: a package information acquisition unit that acquires package information about a combination of setting items selected from a plurality of setting items related to driving assistance; a link generation unit that generates a link that allows access to the acquired package information; a vehicle information acquisition unit that acquires vehicle information about a vehicle of a user who has accessed the link; and a determination unit that determines whether the combination of the setting items is applicable to the vehicle based on the acquired vehicle information.

13 Claims, 7 Drawing Sheets

(56) References Cited

U.S. PATENT DOCUMENTS

| | | | | |
|---|---|---|---|---|
| 2008/0285804 | A1* | 11/2008 | Sefton | G06V 20/52 382/105 |
| 2009/0324010 | A1* | 12/2009 | Hou | G06V 20/52 382/103 |
| 2010/0161481 | A1* | 6/2010 | Littrell | G07F 15/005 705/40 |
| 2010/0161482 | A1* | 6/2010 | Littrell | B60L 53/67 705/40 |
| 2010/0280700 | A1* | 11/2010 | Morgal | G06Q 10/02 705/5 |
| 2011/0076988 | A1* | 3/2011 | Zigman | G07C 9/22 455/411 |
| 2011/0136429 | A1* | 6/2011 | Ames | H04B 5/48 235/382 |
| 2012/0072837 | A1* | 3/2012 | Triola | G06Q 10/10 715/268 |
| 2012/0109660 | A1* | 5/2012 | Xu | G06Q 30/0283 707/769 |
| 2012/0155712 | A1* | 6/2012 | Paul | G06V 20/625 382/105 |
| 2012/0271816 | A1* | 10/2012 | Hansberger | G06Q 30/0623 707/E17.014 |
| 2012/0294238 | A1* | 11/2012 | Uhler | G08G 1/017 370/328 |
| 2012/0296747 | A1* | 11/2012 | Triola | G06Q 30/0613 705/14.66 |
| 2014/0046800 | A1* | 2/2014 | Chen | G06Q 30/0623 705/26.61 |
| 2014/0195099 | A1* | 7/2014 | Chen | G06F 16/248 701/29.6 |
| 2014/0195101 | A1* | 7/2014 | Chen | G07C 5/0841 701/29.6 |
| 2014/0337319 | A1* | 11/2014 | Chen | G06Q 30/0601 707/722 |
| 2015/0058224 | A1* | 2/2015 | Gaddam | G06Q 20/327 705/44 |
| 2015/0206357 | A1* | 7/2015 | Chen | G06F 16/2428 701/31.4 |
| 2015/0294174 | A1* | 10/2015 | Karkowski | G06F 16/5838 382/182 |
| 2016/0097648 | A1* | 4/2016 | Hannah | G08G 1/0116 701/118 |
| 2016/0300119 | A1* | 10/2016 | Silva | G06F 16/248 |
| 2017/0140641 | A1* | 5/2017 | Flick | B60R 25/24 |
| 2018/0003593 | A1* | 1/2018 | Siegel | B60C 11/246 |
| 2018/0089917 | A1* | 3/2018 | Obaidi | G06Q 10/083 |
| 2018/0130044 | A1* | 5/2018 | Gage | G06Q 20/4015 |
| 2018/0267527 | A1* | 9/2018 | Rubin | H04W 4/025 |
| 2019/0080313 | A1* | 3/2019 | Van Wiemeersch | B60R 25/305 |
| 2019/0281027 | A1* | 9/2019 | Cao | H04L 63/0442 |
| 2019/0316927 | A1* | 10/2019 | Pu | G01C 21/16 |
| 2020/0151742 | A1* | 5/2020 | Hamagami | G06V 40/174 |
| 2020/0284883 | A1* | 9/2020 | Ferreira | G01S 7/4815 |
| 2021/0209519 | A1* | 7/2021 | Baskin | G06Q 50/40 |
| 2022/0089127 | A1* | 3/2022 | Hanaoka | G06Q 50/40 |
| 2022/0164662 | A1* | 5/2022 | Saki | G10L 15/20 |

OTHER PUBLICATIONS

Dakroub, Husein, and Robert Cadena. "Analysis of software update in connected vehicles." SAE International Journal of Passenger Cars—Electronic and Electrical Systems 7.2014-01-0256 (2014): 411-417. (Year: 2014).*

* cited by examiner

VEHICLE INFORMATION PROCESSING DEVICE, VEHICLE INFORMATION PROCESSING SYSTEM, AND VEHICLE INFORMATION PROCESSING METHOD

CROSS-REFERENCE TO RELATED APPLICATION

This application claims priority to Japanese Patent Application No. 2022-114329 filed on Jul. 15, 2022, incorporated herein by reference in its entirety.

BACKGROUND

1. Technical Field

The present disclosure relates to a vehicle information processing device, a vehicle information processing system, and a vehicle information processing method.

2. Description of Related Art

Japanese Unexamined Patent Application Publication No. 2018-097764 (JP 2018-097764 A) discloses an in-vehicle data update device capable of autonomously resuming an update even when an update of in-vehicle software or the like is incomplete.

SUMMARY

When there are many options for setting items regarding setting items of a vehicle, the user may be confused about which setting to apply to the vehicle that the user owns.

In consideration of the above fact, it is an object of the present disclosure to provide a vehicle information processing device, a vehicle information processing system, and a vehicle information processing method that can reduce the user's burden of changing settings of a vehicle.

A vehicle information processing device according to a first aspect includes: a package information acquisition unit that acquires package information about a combination of setting items selected from a plurality of setting items related to driving assistance; a link generation unit that generates a link that allows access to the acquired package information; a vehicle information acquisition unit that acquires vehicle information about a vehicle of a user who has accessed the link; and a determination unit that determines whether the combination of the setting items is applicable to the vehicle based on the acquired vehicle information.

According to the present disclosure described in the first aspect, the package information acquisition unit acquires the package information regarding a combination of the setting items selected from a plurality of setting items related to driving assistance. Then, the link generation unit generates a link that allows access to the acquired package information.

When the user accesses this link, the vehicle information acquisition unit acquires the vehicle information regarding the vehicle of the user. Based on the acquired vehicle information, the determination unit determines whether the combination of the setting items is applicable to the vehicle of the user.

In other words, the user can know whether a combination of the setting items selected from a plurality of setting items related to driving assistance is applicable to the vehicle of the user simply by accessing the link generated in advance. This saves the user the trouble of researching and combining setting items applicable to the own vehicle. Therefore, the user can easily change the setting of the vehicle.

The vehicle information processing device according to a second aspect further includes, in the disclosure according to the first aspect, a setting change unit that changes a setting of the vehicle when the combination of the setting items is applicable to the vehicle.

According to present disclosure described in the second aspect, when the combination of the setting items of the link accessed by the user is applicable to the vehicle of the user, the setting change unit changes the setting of the vehicle of the user. As a result, the user does not need to perform complicated setting work by himself/herself. Note that the setting change here is a concept that includes not only applying new a setting to the vehicle but also updating a setting that has already been applied to the vehicle.

The vehicle information processing device according to a third aspect further includes, in the disclosure according to the first aspect, a notification unit that displays a purchase screen on at least one of the vehicle of the user and a terminal owned by the user, when the combination of the setting items is applicable to the vehicle and at least some of the setting items are charged.

According to the present disclosure described in the third aspect, when the combination of the setting items of the link accessed by the user is applicable to the vehicle of the user, and at least some of these setting items are charged, a purchase screen is displayed on at least one of the vehicle of the user and the terminal owned by the user.

In the vehicle information processing device according to a fourth aspect, in the disclosure according to the third aspect, the combination of the setting items is able to be purchased as a subscription service.

According to the present disclosure described in the fourth aspect, when the user purchases the combination of the setting items as a subscription service, if the user stops use or applies another setting to the vehicle, the fee thereafter will not be charged. Therefore, the cost burden of the user is reduced.

The vehicle information processing device according to a fifth aspect further includes, in the disclosure according to the third aspect, a registration unit that registers the package information transmitted from a proposer; and a settlement unit that pays an affiliate to the proposer when the combination of the setting items is purchased by the user.

According to the present disclosure described in the fifth aspect, the package information transmitted from the proposer is registered by the registration unit. Then, when the user purchases the combination of the setting items transmitted from the proposer and registered, the settlement unit pays the proposer an affiliate.

A vehicle information processing system according to a sixth aspect includes: the vehicle information processing device according to any one of the first aspect to the fifth aspect; and a vehicle-mounted device that stores the vehicle information.

According to the present disclosure described in the sixth aspect, the package information acquisition unit of the vehicle information processing device acquires the package information regarding a combination of the setting items selected from a plurality of setting items related to driving assistance. Then, the link generation unit of the vehicle information processing device generates a link that allows access to the acquired package information.

When the user accesses this link, the vehicle information acquisition unit of the vehicle information processing device acquires the vehicle information regarding the vehicle of the user from the vehicle-mounted device. Based on the acquired vehicle information, the determination unit of the vehicle information processing device determines whether the combination of the setting items is applicable to the vehicle of the user.

In other words, the user can know whether a combination of the setting items selected from a plurality of setting items related to driving assistance is applicable to the vehicle of the user simply by accessing the link generated in advance. This saves the user the trouble of researching and combining setting items applicable to the own vehicle.

An vehicle information processing method according to a seventh aspect includes: acquiring package information about a combination of setting items selected from a plurality of setting items related to driving assistance; generating a link that allows access to the acquired package information; acquiring vehicle information about a vehicle of a user who has accessed the link; and determining whether the combination of the setting items is applicable based on the acquired vehicle information.

According to the present disclosure described in the seventh aspect, the package information regarding a combination of the setting items selected from a plurality of setting items related to driving assistance is acquired. Then, a link that allows access to the acquired package information is generated.

When the user accesses this link, the vehicle information regarding the vehicle of the user is acquired. Based on the acquired vehicle information, whether the combination of the setting items is applicable to the vehicle of the user is determined.

In other words, the user can know whether a combination of the setting items selected from a plurality of setting items related to driving assistance is applicable to the vehicle of the user simply by accessing the link generated in advance. This saves the user the trouble of researching and combining setting items applicable to the own vehicle.

As described above, the vehicle information processing device according to the present disclosure described in the first aspect has an effect that the user's burden of changing settings of a vehicle can be reduced.

The vehicle information processing device according to the present disclosure described in the second aspect has an effect that the user's trouble of carrying out complicated setting change can be saved.

The vehicle information processing device according to the present disclosure described in the third aspect has an effect that the user's effort in purchasing a combination of setting items can be reduced.

The vehicle information processing device according to the present disclosure described in the fourth aspect has an effect that the user's burden of changing settings of a vehicle can be further reduced.

The vehicle information processing device according to the present disclosure described in the fifth aspect has an effect that registration of the package information can be promoted.

The vehicle information processing system according to the present disclosure described in the sixth aspect has an effect that the user's burden of changing settings of a vehicle can be reduced.

The vehicle information processing method according to the present disclosure described in the seventh aspect has an effect that the user's burden of changing settings of a vehicle can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle information processing system 10 according to an embodiment of the present disclosure will be described below with reference to FIGS. 1 to 7.

Overall Configuration

Figure 1:
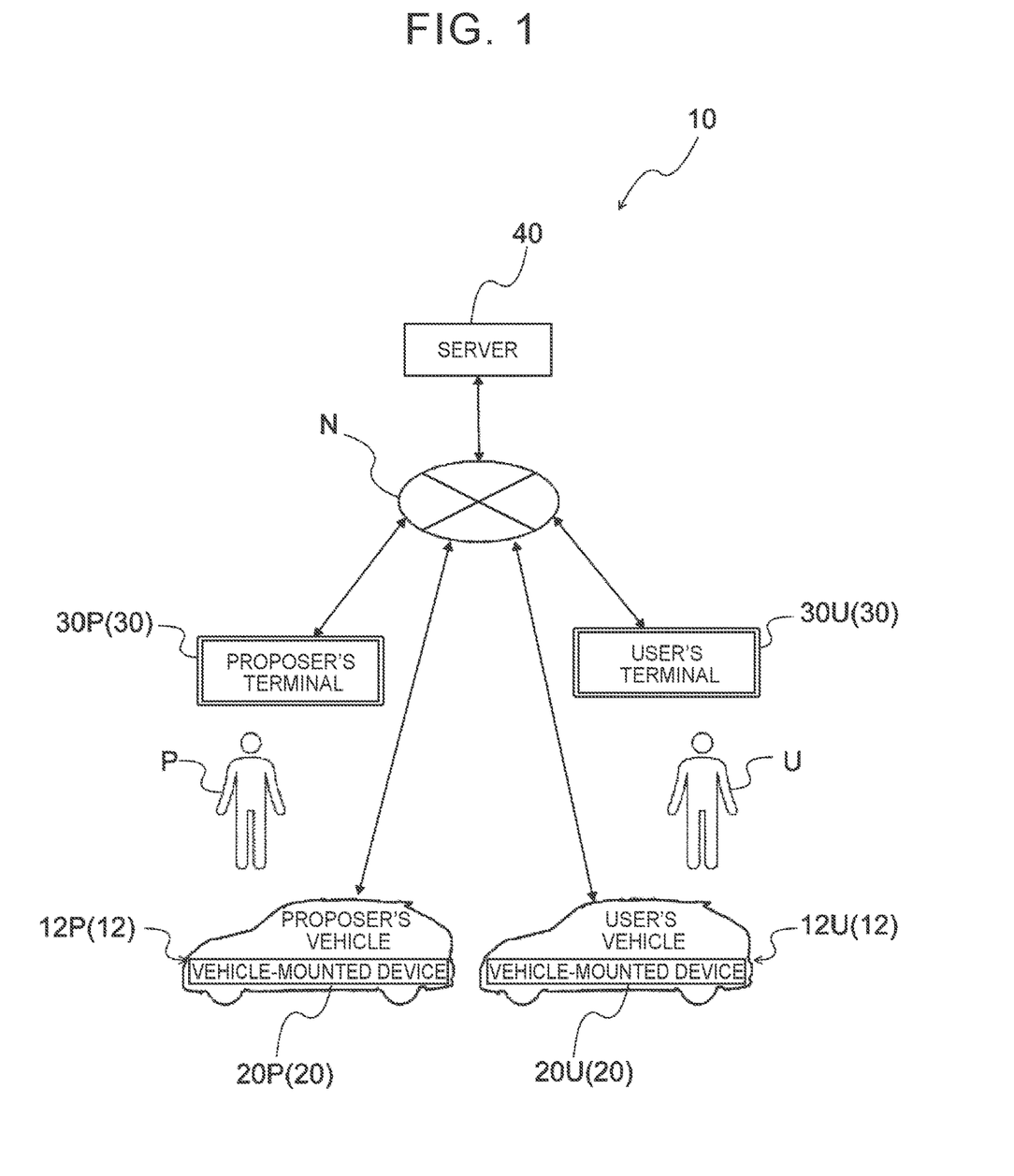
FIG. 1 is a diagram showing a schematic configuration of a vehicle information processing system according to the present embodiment.

As shown in FIG. 1, the vehicle information processing system 10 of the present embodiment includes a plurality of vehicles 12, a plurality of terminals 30, and a server 40 serving as a vehicle information processing device owned by a predetermined business operator. Each vehicle 12 is equipped with a vehicle-mounted device 20. Each vehicle-mounted device 20, each terminal 30, and the server 40 are connected via a network N and can communicate with each other.

Examples of the terminal 30 include a smart phone and a personal computer owned by the owner of the vehicle 12. FIG. 1 shows, as an example of the owner of the vehicle 12, a proposer P and a user U of package information, which will be described later. A vehicle 12P and a terminal 30P owned by the proposer P and a vehicle 12U and a terminal 30U owned by the user U are also illustrated. The vehicle 12P owned by the proposer P is equipped with a vehicle-mounted device 20P. The vehicle 12U owned by the user U is equipped with a vehicle-mounted device 20U. The number of vehicles 12, vehicle-mounted devices 20, and terminals 30 is not limited to the above.

Here, the "package information" is information regarding a combination of setting items selected from a plurality of setting items related to vehicle driving assistance. Examples of driving assistance include collision damage mitigation braking, lane departure warning, inter-vehicle distance control, skidding prevention, staggering warning, parking assistance, acceleration control when the pedal is depressed by mistake, and automatic switching of headlights, but are not limited to the above.

Hardware Configuration of Vehicle 12

Figure 2:
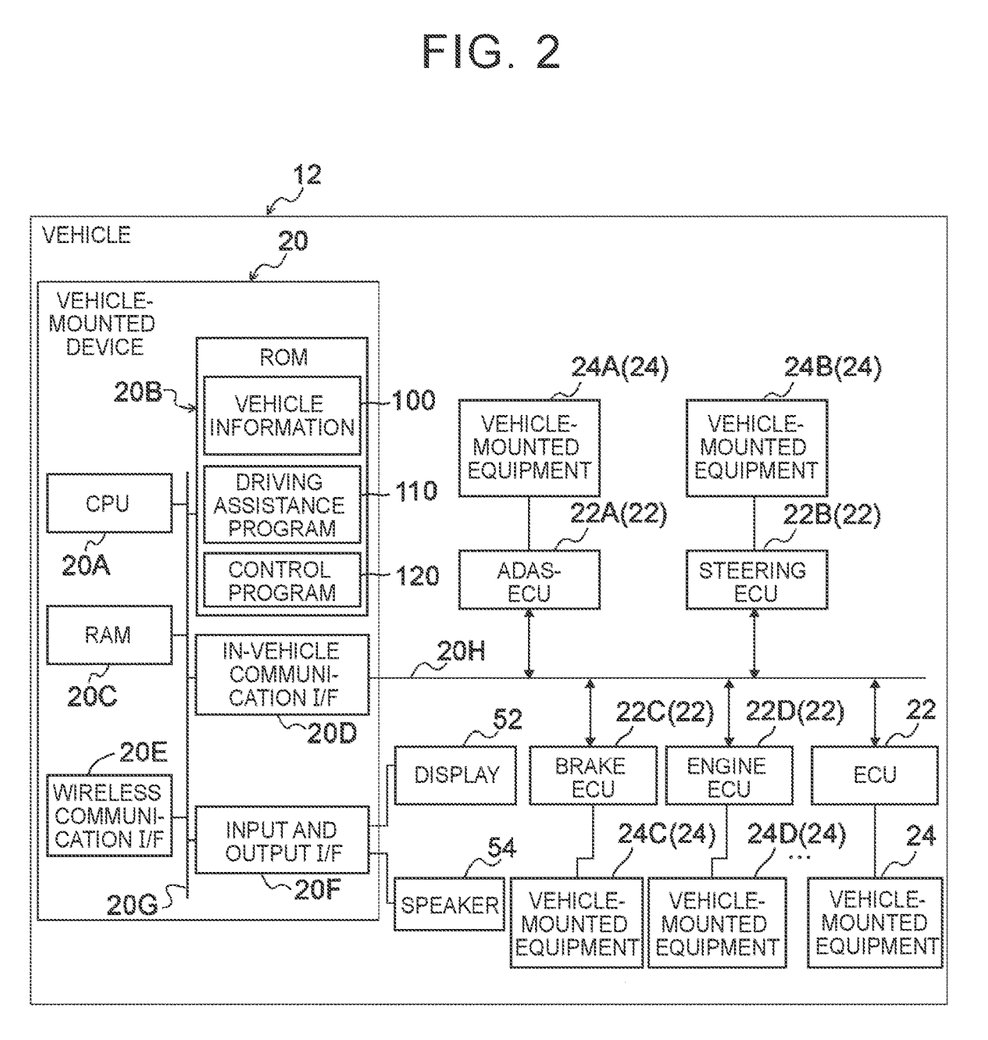
FIG. 2 is a block diagram showing a hardware configuration of a user's vehicle shown in FIG. 1.

As shown in FIG. 2, the vehicle 12 includes the vehicle-mounted device 20, a plurality of electronic control units (ECUs) 22, and a plurality of vehicle-mounted equipment 24.

The vehicle-mounted device 20 includes a central processing unit (CPU) 20A, a read-only memory (ROM) 20B, a random access memory (RAM) 20C, an in-vehicle communication interface (I/F) 20D, a wireless communication I/F 20E, and an input and output I/F 20F. The CPU 20A, the ROM 20B, the RAM 20C, the in-vehicle communication I/F 20D, the wireless communication I/F 20E, and the input and output I/F 20F are connected so as to be able to communicate with each other via an internal bus 20G.

The CPU 20A is a central processing unit that executes various programs and controls various units. That is, the CPU 20A reads the program from the ROM 20B and executes the program using the RAM 20C as a work area. The CPU 20A controls each configuration and performs various arithmetic processes in accordance with the program recorded in the ROM 20B.

The ROM 20B stores various programs and various data. The ROM 20B stores vehicle information 100 such as vehicle type, model number, model year, etc., a driving assistance program 110 for controlling the vehicle 12 so as to assist the occupant's driving, and a control program 120 for controlling the vehicle-mounted device 20. The vehicle information 100 may include driving information related to the state and control of the vehicle 12, which is acquired from the ECU 22, in addition to the information such as the vehicle type described above that remains unchanged from the time of purchase.

The RAM 20C temporarily stores a program or data as a work area.

The in-vehicle communication I/F 20D is an interface for connecting to each of the ECUs 22. A communication standard based on a controller area network (CAN) protocol is used for the in-vehicle communication I/F 20D. The in-vehicle communication I/F 20D is connected to an external bus 20H.

The wireless communication I/F 20E is a wireless communication module for communicating with the server 40. For example, communication standards such as fifth generation (5G), long term evolution (LTE), and Wi-Fi (registered trademark) are used for the wireless communication I/F 20E. The wireless communication I/F 20E is connected to the network N.

The input and output I/F 20F is electrically connected to a display 52 and a speaker 54 provided in the vehicle cabin. For example, the display 52 has a function as a display device that displays various information including information received from the server 40 as an image, and a function as an input device that can input information by being operated by an occupant. The speaker 54 has a function of notifying the occupant of the information from the server 40 by sound.

As an example, the ECUs 22 include an advanced driver assistance system (ADAS)-ECU 22A, a steering ECU 22B, a brake ECU 22C, and an engine ECU 22D.

The ADAS-ECU 22A controls an advanced driver assistance system in an integrated manner. Vehicle-mounted equipment 24A is connected to the ADAS-ECU 22A. The vehicle-mounted equipment 24A includes a vehicle speed sensor, an acceleration sensor, and a yaw rate sensor. The vehicle-mounted equipment 24A also includes an external sensor group used to detect the surrounding environment of the vehicle 12. The external sensor group includes, for example, a camera that captures images of surrounding areas of the vehicle 12, a millimeter-wave radar that transmits an exploration wave and receives a reflective wave, a laser imaging detection and ranging (LiDAR) sensor that scans a front area of the vehicle 12, and the like.

The steering ECU 22B is connected to vehicle-mounted equipment 24B. The vehicle-mounted equipment 24B is a power steering device including a steering angle sensor.

The brake ECU 22C controls a brake system of the vehicle 12. Vehicle-mounted equipment 24C including a brake actuator is connected to the brake ECU 22C.

The engine ECU 22D controls an engine of the vehicle 12. Vehicle-mounted equipment 24D including a throttle actuator is connected to the engine ECU 22D.

Functional Configuration of Vehicle-Mounted Device 20

Figure 3:
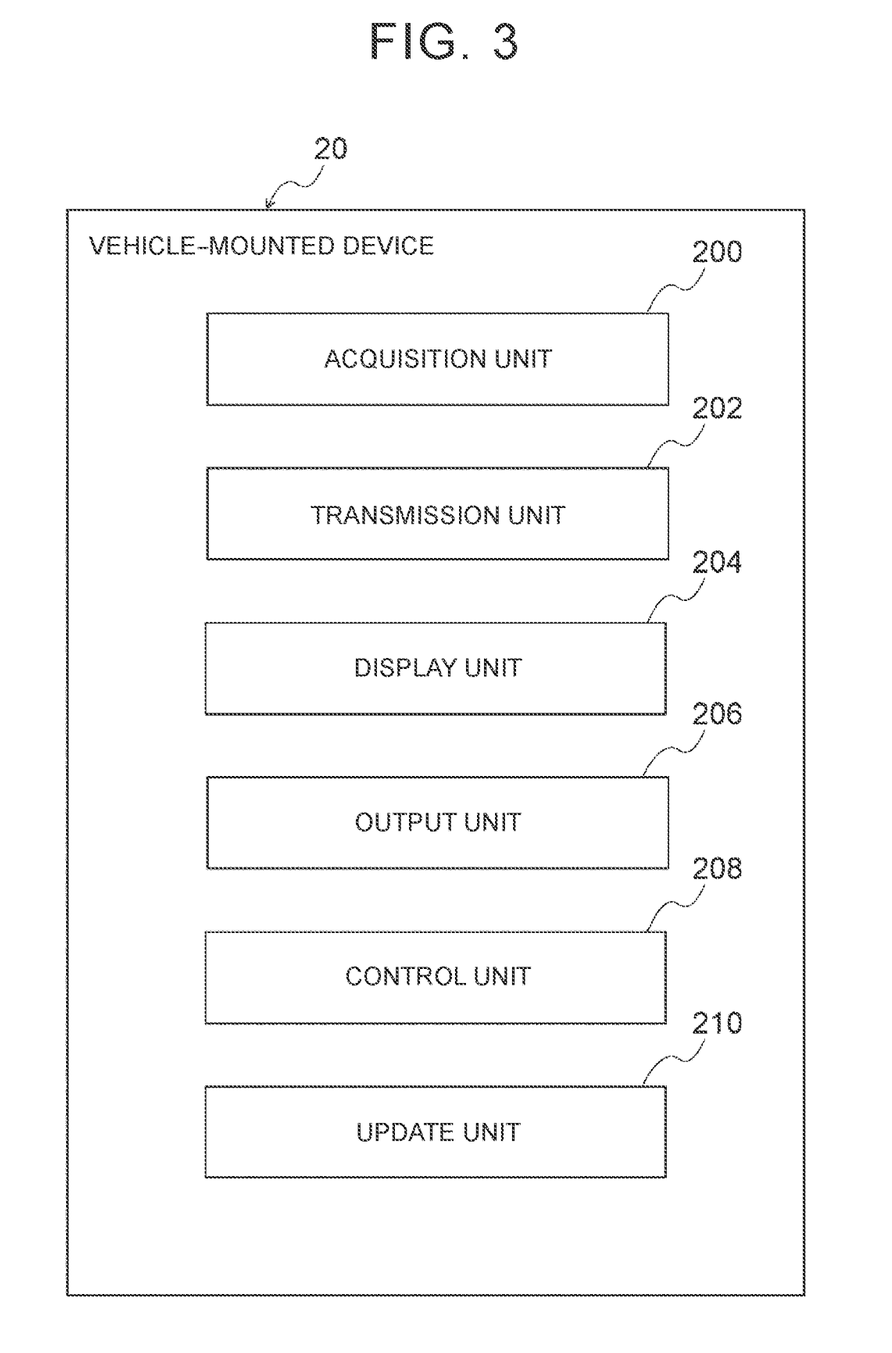
FIG. 3 is a block diagram showing a functional configuration of a vehicle-mounted device shown in FIG. 1.

As shown in FIG. 3, the vehicle-mounted device 20 functions as an acquisition unit 200, a transmission unit 202, a display unit 204, an output unit 206, a control unit 208, and an update unit 210 as the CPU 20A executes the control program 120.

The acquisition unit 200 has a function of acquiring signals from various sensors serving as the display 52 and the vehicle-mounted equipment 24. The acquisition unit 200 also has a function of acquiring information on setting items, image information, audio data, and other information transmitted from at least one of the terminal 30 and the server 40. Here, the information on setting items is not limited to the package information including a plurality of setting items among the setting items related to driving assistance, and includes information about one setting item.

The transmission unit 202 has a function of transmitting the vehicle information 100 stored in the ROM 20B to at least one of the terminal 30 and the server 40. The transmission unit 202 also has a function of transmitting a signal input on the display 52 and acquired by the acquisition unit 200 to at least one of the terminal 30 and the server 40. Examples of the input of a signal on the display 52 include a case where the user U selects a setting item on the display 52 of the vehicle 12U, a case where the purchase button is pressed, and the like. Furthermore, the transmission unit 202 has a function of transmitting the package information regarding a combination of the setting items applied to the vehicle 12 to at least one of the terminal 30 and the server 40.

The display unit 204 has a function of displaying an image transmitted from the server 40 on the display 52. For example, the display unit 204 displays the purchase screen transmitted from the server 40 on the display 52.

The output unit 206 has a function of outputting audio data transmitted from the server 40 to the speaker 54.

The control unit 208 has a function of controlling the vehicle 12 based on the driving assistance program 110. The control unit 208 controls various actuators serving as the vehicle-mounted equipment 24 based on signals obtained from various sensors serving as the vehicle-mounted equipment 24.

The update unit 210 has a function of rewriting the driving assistance program 110 stored in the ROM 20B in accordance with the information regarding the setting items acquired by the acquisition unit 200.

Hardware Configuration of Server 40

Figure 4:
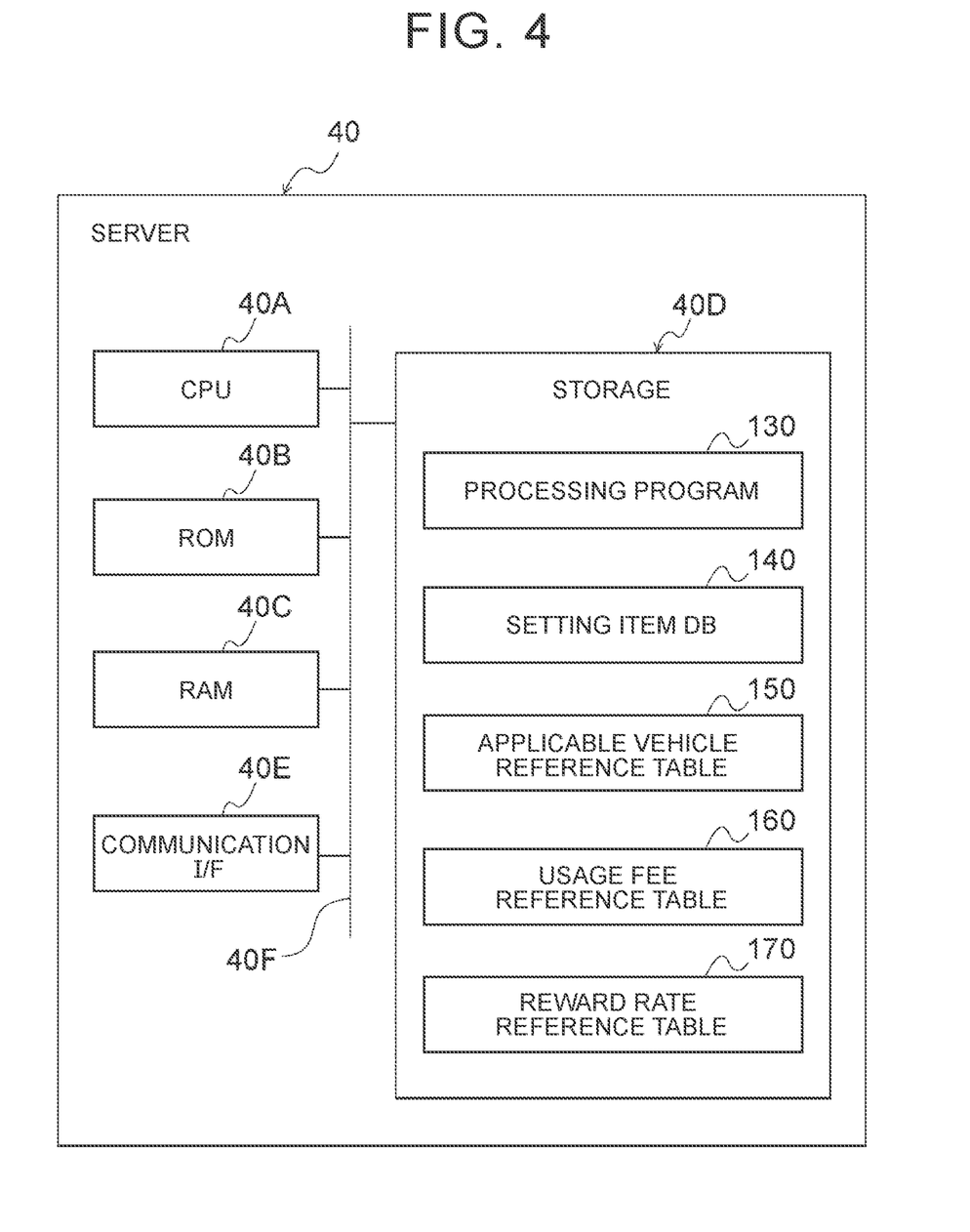
FIG. 4 is a block diagram showing a hardware configuration of a server shown in FIG. 1.

As shown in FIG. 4, the server 40 includes a CPU 40A, a ROM 40B, a RAM a storage 40D, and a communication I/F 40E. The CPU 40A, the ROM 40B, the RAM 40C, the storage 40D, and the communication I/F 40E are connected so as to be able to communicate with each other via an internal bus 40F. The functions of the CPU 40A, the ROM 40B, the RAM 40C and the communication I/F 40E are the same as those of the CPU 20A, the ROM 20B, the RAM 20C and the wireless communication I/F 20E of the vehicle-mounted device 20 described above.

The storage 40D serving as a memory is composed of a hard disk drive (HDD) or a solid state drive (SSD).

A processing program 130 for controlling the server 40 is stored in the storage 40D. Along with the execution of the processing program 130, the server 40 executes processes including a link generation process for generating a link related to the package information, a registration process for the package information and the link, and a registration information extraction process for extracting the package information registered in association with the link. In addition, the processing program 130 executes a provision process for performing control in accordance with the vehicle information 100 of the user U who has accessed the link. These processes will be described in detail later with reference to FIGS. 6 and 7.

The storage 40D also stores a setting item DB 140 that is a database regarding setting items for driving assistance. The setting item DB 140 stores a list of setting items related to driving assistance. The setting item DB 140 also stores the package information regarding a combination of a plurality of setting items transmitted from the proposer P in association with the created link.

Further, the storage 40D stores an applicable vehicle reference table 150 in which information about the vehicle such as the vehicle type, the model number, and the model year to which each setting item is applicable is stored.

Furthermore, the storage 40D stores a usage fee reference table 160 that stores the usage fee of each setting item and a coefficient for calculating the usage fee for a combination of a plurality of setting items.

The storage 40D also stores a reward rate reference table 170 that stores the reward rate for each setting item when the setting item is purchased individually and the reward rate for each combination when a combination of the setting items is purchased. It should be noted that various methods can be adopted for calculating the reward rate.

In the present embodiment, it has been described that the storage 40D stores the processing program 130, the setting item DB 140, the applicable vehicle reference table 150, the usage fee reference table 160, and the reward rate reference table 170, but the ROM may store the processing program 130, the setting item DB 140, the applicable vehicle reference table 150, the usage fee reference table 160, and the reward rate reference table 170.

Functional Configuration of Server 40

Figure 5:
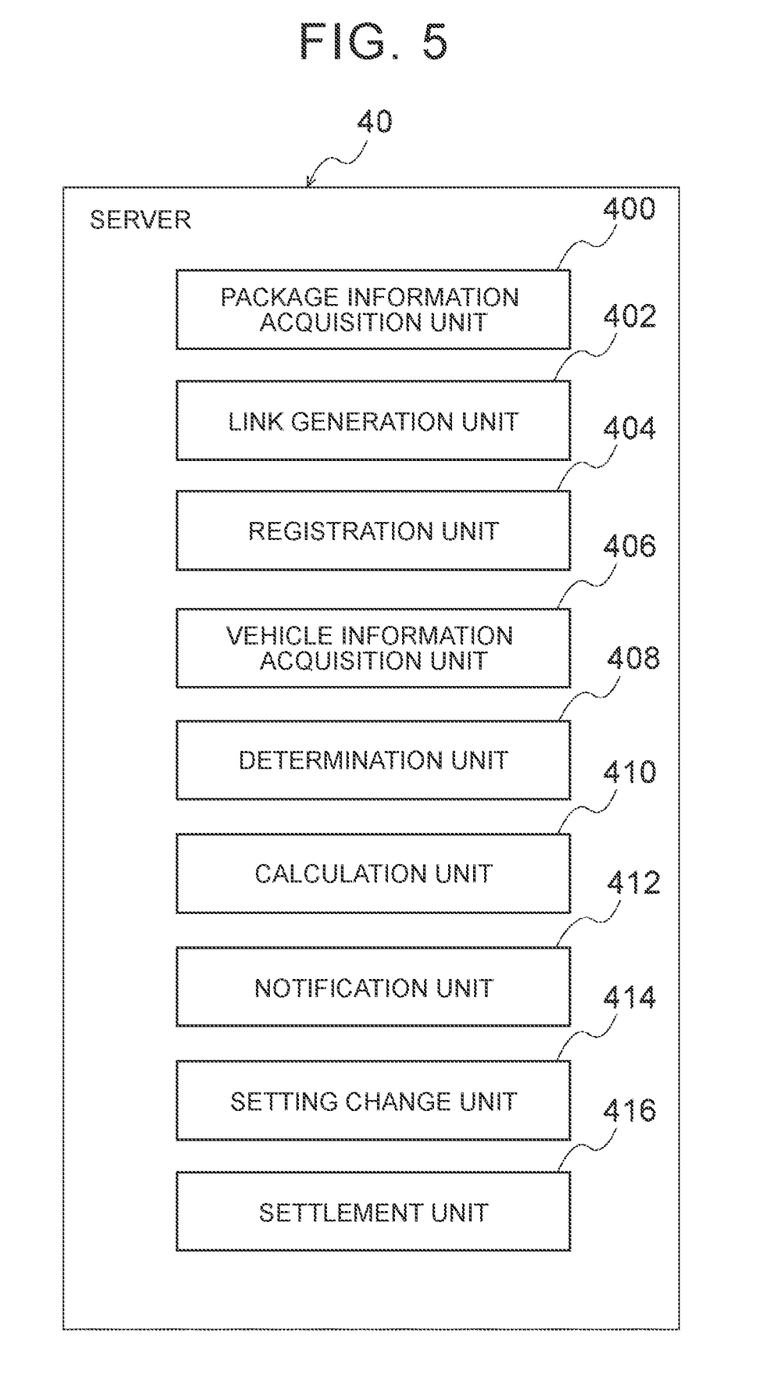
FIG. 5 is a block diagram showing a functional configuration of the server shown in FIG. 1.

As shown in FIG. 5, the server 40 functions as a package information acquisition unit 400, a link generation unit 402, a registration unit 404, a vehicle information acquisition unit 406, a determination unit 408, a calculation unit 410, a notification unit 412, a setting change unit 414, and a settlement unit 416 as the CPU 40A executes the processing program 130.

The package information acquisition unit 400 has a function of acquiring the package information regarding a combination of the setting items from at least one of the vehicle-mounted device 20P of the vehicle 12P and the terminal 30P of the proposer P.

The link generation unit 402 has a function of generating a link that allows access to the acquired package information.

The registration unit 404 has a function of associating the acquired package information with the generated link and registering them in the setting item DB 140.

The vehicle information acquisition unit 406 has a function of acquiring the vehicle information 100 from the vehicle-mounted device 20U of the vehicle 12U of the user U who has accessed the link generated by the link generation unit 402 and registered by the registration unit 404.

The determination unit 408 has a function of referring to the applicable vehicle reference table 150 based on the acquired vehicle information 100 to determine whether the combination of the setting items of the package information associated with the link is applicable to the vehicle 12U of the user U who has accessed the link. At this time, the determination unit 408 determines not only whether the combination of the setting items is applicable to vehicle 12U as a package, but also whether individual setting items are applicable to the vehicle 12U. Note that the determination unit 408 is not limited to determining the above, and may determine, for example, only whether the combination of the setting items is applicable to the vehicle 12U as a package.

Also, the determination unit 408 determines whether there is a charged item among the applicable setting items, based on the usage fee of the setting items obtained by the calculation unit 410, which will be described later.

Furthermore, the determination unit 408 determines whether the user U has performed an action of application or purchase. For example, the determination unit 408 determines whether the apply button or the purchase button has been pressed on the terminal of the user U. The determination unit 408 is not limited to the above, and, for example, the determination unit 408 may determine whether the apply button or the purchase button has been pressed on the display 52 of the vehicle 12 of the user U.

Based on the applicability information determined by the determination unit 408, the calculation unit 410 refers to the usage fee reference table 160 and calculates the usage fee of the setting item. Specifically, when a combination of the setting items of the package information can be directly applied to the vehicle 12U as a package, the calculation unit 410 calculates the package usage fee for the combination.

On the other hand, when the combination of the setting items of the package information cannot be applied to the vehicle 12U as a package as it is, the calculation unit 410 calculates the usage fee for applicable setting items from the usage fee for each setting item. At this time, when there is only one setting item applicable to the vehicle 12U, the usage fee of the setting item is directly calculated as the usage fee. On the other hand, when there is a plurality of setting items applicable to the vehicle 12U, the usage fee for the combination of the setting items is calculated from the usage fee for each setting item. It should be noted that the usage fee for a combination of the setting items is not limited to the sum of the usage fee for each setting item, and may be calculated by any preset formula.

The calculation unit 410 also has a function of referring to the reward rate reference table 170 and calculating an affiliate to be paid to the proposer P in accordance with the setting items applied to the vehicle 12U of the user U.

The notification unit 412 has a function of notifying the vehicle 12 and the terminal 30. The notification method includes a display on the display 52, an audio output from the speaker 54, a mail transmission to the terminal 30, a notification to an application downloaded to the terminal 30, and the like. Examples of notification contents include a display of application screens and purchase screens of the setting item, a vehicle setting change completion notification, a usage fee charging notification, an affiliate payment completion notification, and the like.

The setting change unit 414 applies applicable setting items to the vehicle 12U of the user U based on the result determined by the determination unit 408, and changes the setting of the vehicle 12U. Specifically, information regarding applicable setting items is transmitted to the vehicle 12U so that the update unit 210 of the vehicle-mounted device 20U can rewrite the driving assistance program 110.

The settlement unit 416 has a function of charging the user U for the cost of changing the setting of the vehicle 12U. The settlement unit 416 also has a function of paying the affiliate to the proposer P of the package information in accordance with the setting items applied to the vehicle 12U of the user U.

Example of Process Flow

Next, the flow of processes executed by the vehicle information processing system 10 will be described with reference to the sequence diagram shown in FIG. 6 and the flowchart shown in FIG. 7.

Figure 6:
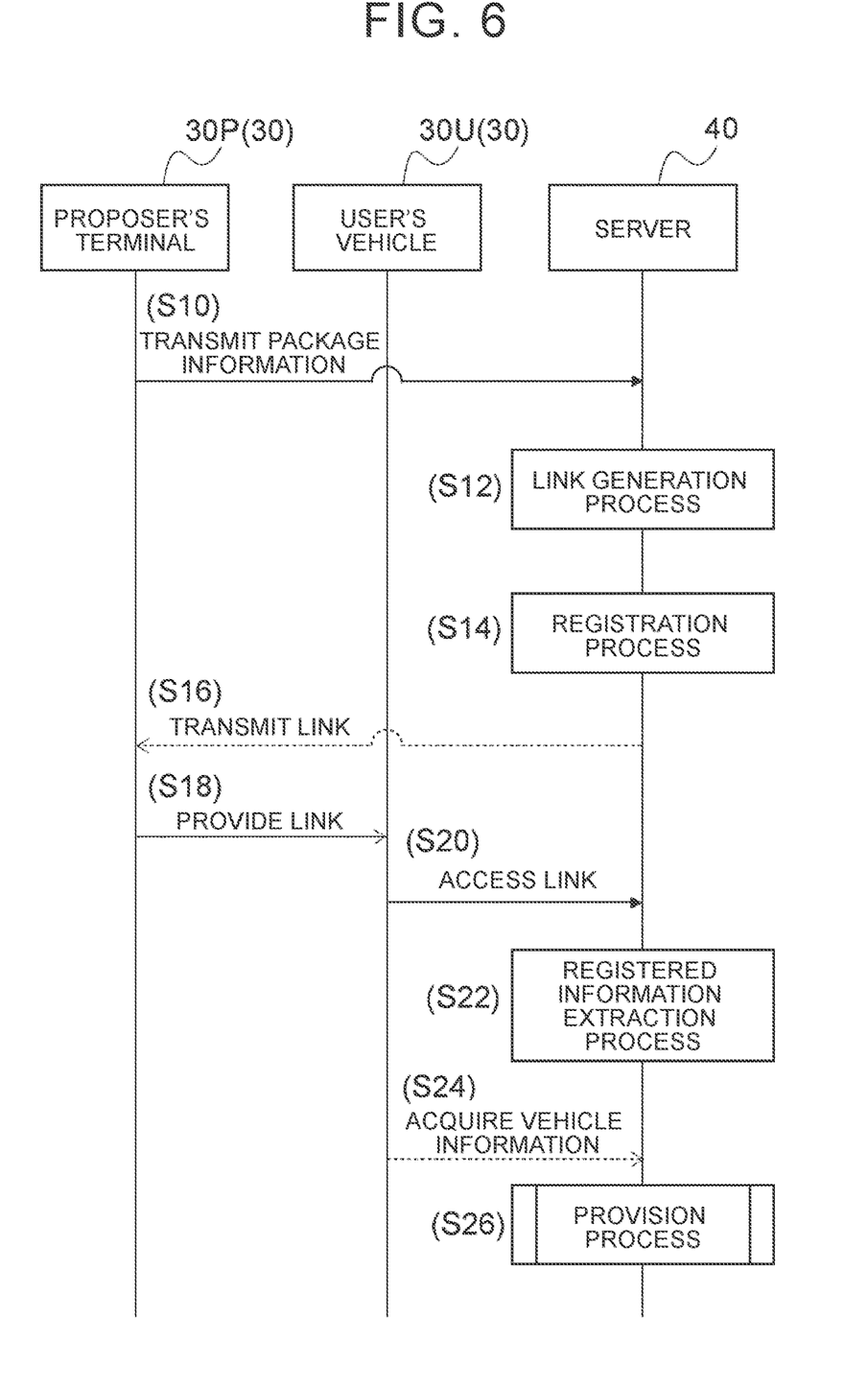
FIG. 6 is a sequence diagram showing the flow of processes in the vehicle information processing system shown in FIG. 1.
Figure 7:
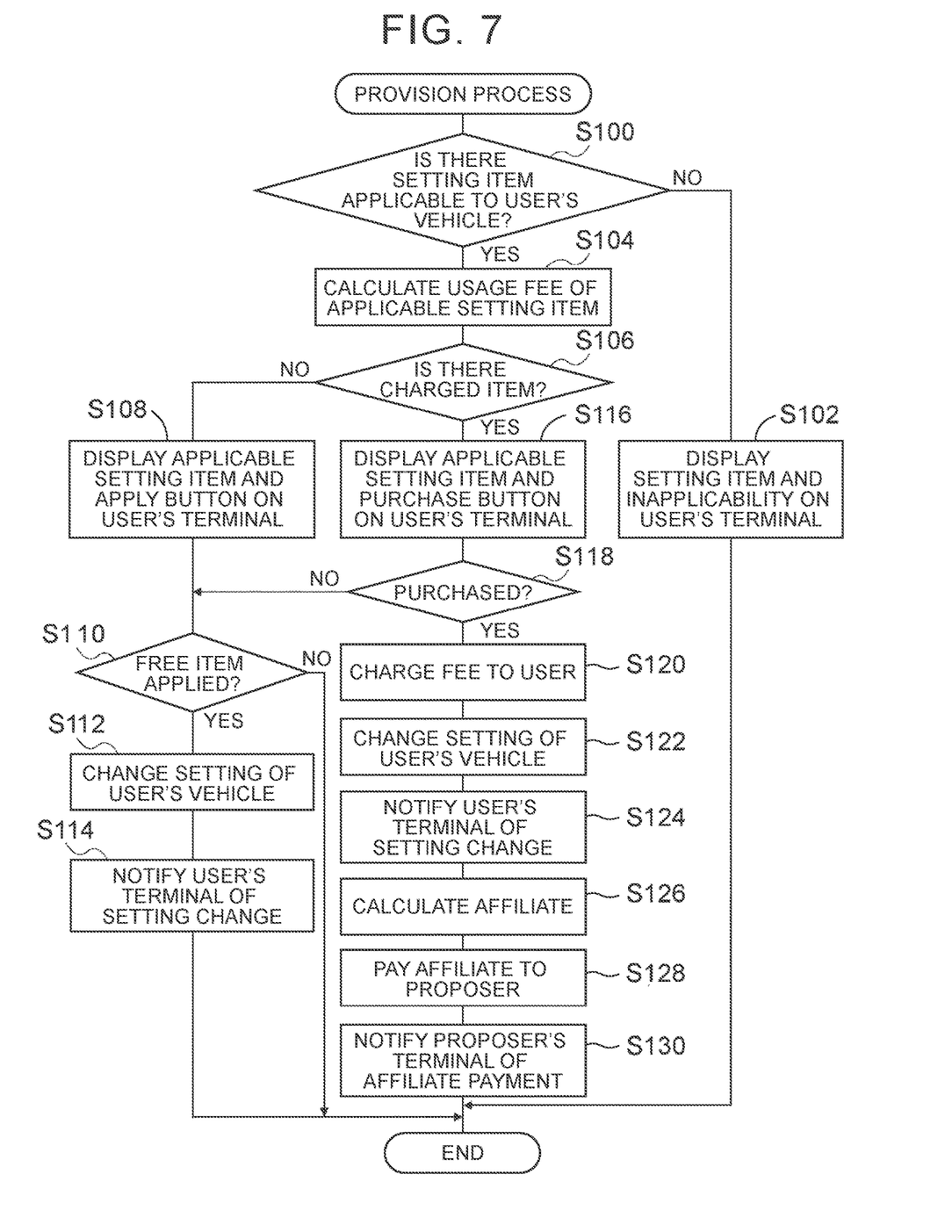
FIG. 7 is a flowchart showing the flow of a provision process executed in the server shown in FIG. 6.

In step S10 of FIG. 6, the package information is transmitted from the terminal 30P of the proposer P to the server 40. This package information is, for example, a combination of the setting items selected from a list of setting items displayed in an application when the proposer P opens the application downloaded to the terminal 30P. The package information is not limited to this, and may be a combination of the setting items selected by the proposer P from a list of setting items displayed on the display 52 of the vehicle 12P. The package information may be a combination of the setting items already applied to the vehicle 12P of the proposer P, which is transmitted to the server 40 by the proposer P operating at least one of the display 52 and the terminal 30P.

In step S12, the CPU 40A of the server 40 generates a link that allows access to the package information acquired from the terminal 30P of the proposer P.

In step S14, the CPU 40A of the server 40 associates the acquired package information with the generated link and registers them in the setting item DB 140.

In step S16, the CPU 40A of the server 40 transmits the generated link to the terminal 30P of the proposer P.

In step S18, the proposer P provides the user U with the generated link. For example, an email attached with a link is transmitted from the terminal 30P of the proposer P to the terminal 30U of the user U. Note that the link providing method is not limited to this. For example, the link may be provided via an application downloaded to the terminal 30. Further, the proposer P may release the link on a blog or social media, and the link may be provided to the user U who browses the blog or social media.

In step S20, the user U accesses the link provided by the proposer P.

In step S22, the CPU 40A of the server 40 extracts the package information associated with the accessed link from the setting item DB 140.

In step S24, the CPU 40A of the server 40 acquires the vehicle information 100 from the vehicle-mounted device 20U of the vehicle 12U of the user U who has accessed the link.

In step S26, the CPU 40A of the server 40 performs the provision process.

The provision process will be described in detail below with reference to FIG. 7. In step S100 of FIG. 7, the CPU 40A determines whether the setting items of the package information extracted from the setting item DB 140 is applicable to the vehicle 12U of the user U based on the acquired vehicle information 100.

When the CPU 40A determines in step S100 that none of the setting items included in the package information can be applied to the vehicle 12U of the user U, the CPU 40A causes the terminal 30U of the user U to display a list of setting items included in the package information and a message indicating that these setting items cannot be applied in step S102, and the process ends.

On the other hand, when the CPU 40A determines in step S100 that there is at least one setting item applicable to the vehicle 12U of the user U among the setting items included in the package information, the CPU 40A calculates the usage fee of the applicable setting item in step S104.

For example, when the CPU 40A determines in step S100 that the combination of the setting items of the package information can be applied to the vehicle 12U as a package as it is, the CPU 40A calculates the package usage fee for the combination in step S104.

Further, when the CPU 40A determines in step S100 that the combination of the setting items of the package information cannot be applied to the vehicle 12U as a package as it is, but some of the setting items are applicable to the vehicle 12U, the CPU calculates the usage fee for the combination of applicable setting items from the usage fee for each applicable setting item.

In step S106, the CPU 40A determines whether there is a charged item among the applicable setting items.

When the CPU 40A determines in step S106 that there is no charged item, that is, when the usage fee calculated in step S104 is 0 yen, the CPU 40A causes the terminal of the user U to display an image in step S108. Specifically, the CPU 40A causes the terminal 30U of the user U to display a list of setting items applicable to the vehicle 12U among the setting information included in the package information and a bulk apply button for collectively applying the displayed setting items. An apply button may be provided for each setting item. Alternatively, the setting of the vehicle 12U may be immediately changed when the user U accesses the link without the display.

In step S110, the CPU 40A determines whether the apply button has been pressed.

When the CPU 40A determines in step S110 that the apply button has not been pressed, that is, when the user U has not applied any of the displayed setting items, the CPU 40A ends the process. The case where the user U has not applied any of the displayed setting items corresponds to, for example, a case where the user U has closed the application on the terminal 30U, or a case where a predetermined time has passed without the apply button being pressed.

When the CPU 40A determines in step S110 that the apply button has been pressed, that is, when the user U applies at least one of the displayed setting items to the vehicle 12U, the CPU 40A changes the setting of the vehicle 12U of the user U in step S112. Specifically, the CPU 40A transmits information regarding applicable setting items to the vehicle 12U so that the update unit 210 of the vehicle-mounted device 20U can rewrite the driving assistance program 110.

In step S114, the CPU 40A notifies the terminal 30U of the user U that a setting change of the vehicle 12U will be performed, and ends the process.

When the CPU 40A determines in step S106 that there is a charged item, the CPU 40A displays a purchase screen on the terminal 30U of the user U in step S116. Specifically, the CPU 40A causes the terminal 30U to display a list of setting items applicable to the vehicle 12U among the setting information included in the package information, and a purchase button for each charged item. In addition to displaying the purchase button, an apply button may be provided for a free setting item. A bulk purchase button may also be provided.

In step S118, the CPU 40A determines whether the purchase button has been pressed.

When the CPU 40A determines in step S118 that the purchase button has not been pressed, that is, when the user U has not purchased any of the displayed setting items, the CPU 40A determines in step S110 whether the apply button for the free item has been pressed. Since the processes of step S110 and after have already been described, the description thereof will be omitted.

When the CPU 40A determines in step S118 that the purchase button has been pressed, that is, when the user U has purchased at least one of the displayed setting items, the CPU 40A charges the usage fee for the setting item to the user U in step S120.

In step S122, the CPU 40A changes the setting of the vehicle 12U of the user U for the charged item and the applied free item.

In step S124, the CPU 40A notifies the terminal 30U of the user U that the setting change of the vehicle 12U will be performed.

In step S126, the CPU 40A calculates the affiliate to be paid to the proposer P.

In step S128, the CPU 40A pays the affiliate to the proposer P.

In step S130, the CPU 40A notifies the terminal 30P of the proposer P that the affiliate has been paid, and ends the process.

Although illustration is omitted, the user U can also purchase setting items as a subscription service. In the case where the user U uses the setting items as a subscription service, when the CPU 40A receives a service use stop request from the terminal 30U of the user U, the CPU 40A changes the setting of the vehicle 12U of the user U in response to the request. The CPU 40A then stops periodical charging of the usage fee to the user U. In addition to a case where a use stop request of the service is received, use of the subscription service may be stopped when it is no longer possible to continue using the corresponding setting item such as when the user U applies other settings of the same type to the vehicle 12U.

Operation of Present Embodiment

With the vehicle information processing system 10 including the server 40 according to the present embodiment, the package information acquisition unit 400 acquires the package information regarding a combination of the setting items selected from a plurality of setting items related to driving assistance. Then, the link generation unit 402 generates a link that allows access to the acquired package information.

When the user U accesses this link, the vehicle information acquisition unit 406 acquires the vehicle information 100 regarding the vehicle 12U of the user U. Based on the acquired vehicle information 100, the determination unit 408 determines whether the combination of the setting items is applicable to the vehicle 12U of the user U.

In other words, the user U can know whether a combination of the setting items selected from a plurality of setting items related to driving assistance is applicable to the vehicle 12U of the user U simply by accessing the link generated in advance. This saves the user U the trouble of researching and combining setting items applicable to the own vehicle 12U. Therefore, it is possible to lower the hurdles for the user U to change the setting of the vehicle 12U.

For example, if a celebrity who is familiar with vehicle settings releases a combination of the setting items of his/her own vehicle 12P as a link on social media or a blog as the proposer P, the user U can apply the same setting as that of an admired celebrity to his/her own vehicle 12U by simply accessing the link.

As another example, a family member of an elderly person combines setting items on the terminal 30P as the proposer P and transmits a link to the elderly person, so that the elderly person can easily apply the setting recommended by the family to the vehicle 12U as the user U.

As yet another example, by accessing a link released in a social media group or community site, the user U can apply the same setting as that of an acquaintance serving as the proposer P to the own vehicle 12U simply by accessing the link.

Further, with the server 40 according to the present embodiment, when the combination of the setting items of the link accessed by the user U is applicable to the vehicle 12U of the user U, the setting change unit 414 changes the setting of the vehicle 12U of the user U. As a result, the user U does not need to perform complicated setting work by himself/herself.

Furthermore, with the server 40 according to the present embodiment, when the combination of the setting items of the link accessed by the user U is applicable to the vehicle 12U of the user U, and at least some of these setting items are charged, a purchase screen is displayed on the terminal 30U owned by the user U. Therefore, the user U can easily purchase the combination of the setting items.

Furthermore, with the server 40 according to the present embodiment, when the user U purchases the combination of the setting items as a subscription service, if the user U stops use or applies another setting to the vehicle, the fee thereafter will not be charged. Therefore, the cost burden of the user U is reduced.

Further, with the server 40 according to the present embodiment, the package information transmitted from the proposer P is registered by the registration unit 404. Then, when the user U purchases the combination of the setting items transmitted from the proposer P and registered, the settlement unit 416 pays the proposer P an affiliate. Therefore, it is possible to promote the registration of the package information.

Supplementary Description of Above Embodiment

In the embodiment described above, various notifications including images are made on the terminal 30, but the present disclosure is not limited to this. For example, the purchase screen may be displayed on the display 52 of the vehicle 12U of the user U. Further, for example, the notification that the setting change of the vehicle 12U will be performed may be made from the speaker 54 of the vehicle 12U of the user U.

Further, in the embodiment described above, the terminal 30 is described as being operated variously by the proposer P or the user U, but the present disclosure is not limited to this. For example, the proposer P may transmit the package information to the server 40 by operating the display 52 of the vehicle 12P.

Furthermore, in the embodiment described above, the proposer P and the user U are described as different persons, but the proposer P and the user U may be the same person. For example, the proposer P may apply a new combination of the setting items created at the terminal 30P to the own vehicle 12P by accessing the link from the display 52 of the own vehicle 12P.

Furthermore, in the embodiment described above, a combination of the setting items is described as being able to be purchased as a subscription service. However, the present disclosure is not limited to this, and only the bulk purchase may be available as an option.

Further, in the embodiment described above, the affiliate is described as to be paid to the proposer P, but the present disclosure is not limited to this, and the affiliate need not be paid to the proposer P.

What is claimed is:

1. A vehicle information processing device comprising a central processing unit configured to:
    acquire package information about a combination of settings selected from a plurality of settings related to driving assistance;
    generate a link that allows access to the acquired package information;
    acquire a setting information about a vehicle to which each setting in the combination of settings is applicable;
    acquire vehicle information about a vehicle of a user who has accessed the link;
    determine whether each setting in the combination of the settings is applicable to the vehicle based on the acquired vehicle information and the setting information;
    upon determination that at least one setting in the combination of the settings is applicable to the vehicle of the user, calculate a usage fee of the at least one setting, and determine whether the at least one setting is a paid setting;
    upon determination that the paid setting is present among the at least one setting, display a purchase screen on a terminal of the user, and determine whether a purchase button on the purchase screen is pressed;
    upon determination that the purchase button is pressed, charge the usage fee to the user and transmit information on the at least one setting to the vehicle of the user, wherein the at least one setting in the vehicle is updated; and
    upon determination that the paid setting is absent among the at least one setting, transmit information on the at least one setting to the vehicle of the user, wherein the at least one setting in the vehicle is updated.

2. The vehicle information processing device according to claim 1, wherein the central processing unit is further configured to change a setting of the vehicle when the at least one setting in the combination of settings is applicable to the vehicle.

3. The vehicle information processing device according to claim 1, wherein the central processing unit is further configured to display a purchase screen on at least one of the vehicle of the user and the terminal of by the user, when the at least one setting in the combination of settings is applicable to the vehicle and at least some of the setting items are charged.

4. The vehicle information processing device according to claim 3, wherein the combination of settings is able to be purchased as a subscription service.

5. The vehicle information processing device according to claim 3, wherein the central processing unit is further configured to:
    register the package information transmitted from a proposer; and
    pay an affiliate to the proposer when the combination of settings is purchased by the user.

6. A vehicle information processing system comprising:
    the vehicle information processing device according claim 1; and
    a vehicle-mounted device that stores the vehicle information.

7. A vehicle information processing method comprising:
    acquiring package information about a combination of settings selected from a plurality of settings related to driving assistance;
    generating a link that allows access to the acquired package information;
    acquiring a setting information about a vehicle to which each setting in the combination of settings is applicable;
    acquiring vehicle information about a vehicle of a user who has accessed the link;
    determining whether each setting in the combination of settings is applicable based on the acquired vehicle information and the setting information;
    upon determination that at least one setting in the combination of settings is applicable to the vehicle of the user, calculate a usage fee of the at least one setting, and determine whether the at least one setting is a paid settings;
    upon determination that the paid setting is present among the at least one setting, display a purchase screen on a terminal of the user, and determine whether a purchase button on the purchase screen is pressed;
    upon determination that the purchase button is pressed, charge the usage fee to the user and transmit information on the at least one setting to the vehicle of the user, wherein the at least one setting in the vehicle is updated; and
    upon determination that the paid setting is absent among the at least one setting, transmit information on the at least one setting to the vehicle of the user, wherein the at least one setting in the vehicle is updated.

8. The vehicle information processing device according to claim 1, wherein the vehicle information includes information indicating a vehicle type, a model number, and a model year, and the setting information includes information indicating a vehicle type, a model number, and a model year.

9. The vehicle information processing device according to claim 1, wherein the central processing unit is further configured to, upon determination that no settings in the combination of settings is applicable to the vehicle, not transmit the combination of settings to the vehicle.

10. The vehicle information processing system according to claim 6, further comprising the terminal of the user and the vehicle of the user, wherein the vehicle includes the vehicle-mounted device.

11. The vehicle information processing system according to claim 6, further comprising a terminal of a proposer, wherein the terminal of the proposer is configured to transmit the package information to the vehicle information processing device, and to send the link that allows access to the package information to the user upon receipt of the link from the vehicle information processing device.

12. The vehicle information processing device according to claim 1, wherein the user accesses the link from social media or a blog.

13. The vehicle information processing system according to claim 10, wherein a program of the driving assistance in the vehicle is re-written based on the information on the at least one setting.

* * * * *